(12) United States Patent
Girodon (10) Patent No.: US 10,909,530 B2
(45) Date of Patent: Feb. 2, 2021

(54) AUTHENTICATION METHOD (71) Applicant: IDEMIA FRANCE, Colombes (FR)

(72) Inventor: Stéphane Girodon, Colombes (FR)

(73) Assignee: IDEMIA FRANCE, Colombes (FR)

( * ) Notice: Subject to any disclaimer, the term of this patent is extended or adjusted under 35 U.S.C. 154(b) by 187 days.

(21) Appl. No.: 16/064,940

(22) PCT Filed: Dec. 21, 2016

(86) PCT No.: PCT/FR2016/053604
§ 371 (c)(1),
(2) Date: Jun. 21, 2018

(87) PCT Pub. No.: WO2017/109405
PCT Pub. Date: Jun. 29, 2017

(65) Prior Publication Data
US 2019/0005490 A1 Jan. 3, 2019

(30) Foreign Application Priority Data
Dec. 22, 2015 (FR) .................................. 15 63034

(51) Int. Cl.
*H04L 29/00* (2006.01)
*G06Q 20/38* (2012.01)
(Continued)

(52) U.S. Cl.
CPC ......... *G06Q 20/382* (2013.01); *G06Q 20/341* (2013.01); *G06Q 20/4018* (2013.01); *H04L 63/0892* (2013.01)

(58) Field of Classification Search
CPC ............... G06Q 20/382; G06Q 20/341; G06Q 20/4018; H04L 63/0892
See application file for complete search history.

(56) References Cited

U.S. PATENT DOCUMENTS

2005/0043997 A1* 2/2005 Sahota ................. G06Q 20/388
 705/16
2008/0029593 A1* 2/2008 Hammad ............... G06Q 20/04
 235/380
(Continued)

FOREIGN PATENT DOCUMENTS

EP 1 978 479 A1 10/2008

OTHER PUBLICATIONS

International Search Report and Written Opinion dated Apr. 13, 2017, International Application No. PCT/FR2016/053604, 8 pages, (English translation of ISR only).
(Continued)

*Primary Examiner* — Don G Zhao
(74) *Attorney, Agent, or Firm* — MH2 Technology Law Group LLP (57) ABSTRACT

An authentication method performed by an authentication server (ACS). The method includes receiving from an access server (SW) giving access to a service (S), an authentication request including transaction data (DT) associated with an IC card; determining whether a security code included in the transaction data is of the DCVV type; and if so, detecting that no 3D secure (3DS) authentication is to be performed and co-operating with a verification server (SV) in order to verify the validity of the DCVV security code.

15 Claims, 5 Drawing Sheets

(51) Int. Cl.
*G06Q 20/34* (2012.01)
*G06Q 20/40* (2012.01)
*H04L 29/06* (2006.01)

(56) References Cited

U.S. PATENT DOCUMENTS

| | | | | |
|---|---|---|---|---|
| 2008/0110983 | A1* | 5/2008 | Ashfield | G06Q 20/24 235/382 |
| 2009/0055893 | A1* | 2/2009 | Manessis | G06Q 20/04 726/2 |
| 2010/0179909 | A1* | 7/2010 | Dana | G06Q 20/3674 705/67 |
| 2011/0208658 | A1* | 8/2011 | Makhotin | G06F 21/34 705/75 |
| 2012/0018506 | A1* | 1/2012 | Hammad | G06F 21/34 235/375 |
| 2014/0344153 | A1* | 11/2014 | Raj | G06Q 20/3223 705/44 |
| 2015/0032625 | A1* | 1/2015 | Dill | G06Q 20/4016 705/44 |
| 2015/0046338 | A1* | 2/2015 | Laxminarayanan | G06Q 20/38215 705/67 |
| 2015/0161612 | A1* | 6/2015 | Parento | G06Q 20/4018 705/44 |
| 2015/0254668 | A1* | 9/2015 | Guiney | G06Q 20/4014 705/44 |
| 2015/0327071 | A1 | 11/2015 | Sharma | |
| 2015/0371234 | A1* | 12/2015 | Huang | G06Q 20/36 705/44 |
| 2016/0275491 | A1* | 9/2016 | Kaladgi | G06Q 20/322 |
| 2018/0108017 | A1* | 4/2018 | Wilson | G06Q 20/4018 |

OTHER PUBLICATIONS

Crowe, M. et al., "Is Payment Tokenization Ready for Primetime? Perspectives from Industry Stakeholders on the Tokenization Landscape" Jun. 11, 2015, URL: https://www.bostonfed.org/-/media/Documents/PaymentStrategies/tokenization-prime-time.pdf, 51 pages.
Notification Under Article 94(3) EPC dated Nov. 6, 2020, in corresponding European Patent Application No. 16829414.8, pp. 1-13 (Includes Machine Generated English Translation).

* cited by examiner

AUTHENTICATION METHOD

CROSS-REFERENCE TO RELATED APPLICATIONS

This application is a U.S. National Stage application of International Application No. PCT/FR2016/053604 filed 21 Dec. 2016, which claims priority to French Application No. 1563034 filed 22 Dec. 2015, the entire disclosures of which are hereby incorporated by reference in their entireties.

BACKGROUND OF THE INVENTION

The present invention lies in the field of authentication mechanisms, and it relates more particularly to authentication on the basis of a security code of an integrated circuit (IC) card.

The invention may be used in particular for controlling access by a user to an on-line service that is accessible via a telecommunications network, e.g. such as the Internet.

Financial transactions performed remotely (e.g. on line or by telephone), while using a bank card, present risks of fraud that are greater than when the user is present with the bank card at a point of sale. These risks of fraud stem from the fact that there is always a risk that the data concerning a bank card might be stolen and used in malicious manner unknown to the legitimate holder of the bank card. More particularly, there is a risk of a fraudster getting hold of a bank identifier known as the primary account number (PAN), the expiry date of the bank card, and the static security code known as the card verification value (CVV) that is generally to be found on the back of the card.

In order to augment the security of remote financial transactions, an authentication protocol known as 3D Secure (3DS) has been developed. That protocol makes provision for sending a secret code to the user, for example via email or SMS, so as to authenticate the user when the user attempts to perform a transaction remotely with a bank card.

The 3DS authentication protocol is well known to the person skilled in the art, but that protocol also presents certain drawbacks. For example, during a stage of 3DS authentication on the Internet, a window generally opens in the user's Internet browser in order to invite the user to input the secret code that the user has just received by SMS or email. That stage sometimes confuses the user who, under certain circumstances, can lose confidence and abandon the current transaction, in particular if the user has doubts about the authenticity of the invitation window. Furthermore, the user is not always capable of receiving the secret code sent to the user in the context of the 3DS protocol, or does not have the time or the desire to input the secret code when invited to do so.

There exists a need at present for an authentication mechanism that makes it possible to secure an IC transaction effectively while limiting the above-mentioned drawbacks.

OBJECT AND SUMMARY OF THE INVENTION/SUMMARY

To this end, the present invention provides an authentication method performed by an authentication server, the method comprising:

receiving, from an access server giving access to a service, an authentication request including transaction data associated with an IC card;

determining whether a security code included in the transaction data is of the dynamic card verification value (DCVV) type; and if so, detecting that no 3DS authentication is to be performed, and co-operating with a verification server in order to verify the validity of the DCVV security code.

The present invention is advantageous in that it makes it possible to avoid the mechanism of authentication using the 3DS protocol when it is possible to authenticate the user of the transaction by verifying a DCVV dynamic security code generated by the user's smart card (when said card is of the DCVV type). As described above, authentication using the 3DS protocol presents certain drawbacks, in particular in that it can be troublesome for certain users, sometimes leading to the current transaction being abandoned. The invention makes it possible to inhibit the 3DS mechanism while maintaining a high level of security by verifying a DCVV code, when that is possible. By means of the invention, it is possible to facilitate authenticating a user, and thus facilitate access by that user to a service.

In a particular implementation, the authentication method includes sending, to the access server, a positive authentication message concerning the transaction data if the validity of the DCVV code is verified successfully while co-operating with the verification server.

In a particular implementation, the authentication method is such that:

the authentication server determines whether the IC card is of the DCVV type on the basis of a PAN identifier included in the received transaction data; and only if so, the authentication server determines that the security code is of the DCVV type.

In a particular implementation, if the security code is of the DCVV type, the authentication server prevents performance of 3DS authentication of said IC card.

In a particular implementation, if the security code is of the CVV type and if the authentication server determines, on the basis of the transaction data, that it is authorized to proceed with 3DS authentication, the authentication server authorizes the performance of 3DS authentication of said IC card.

In a particular implementation, the IC card is a bank card and the transaction data includes a PAN identifier and an expiry date of said bank card.

In a particular implementation, co-operating with the verification server comprises:

sending, to the verification server, transaction data including the DCVV type security code, the PAN bank identifier, and the expiry date; and in response, receiving the results of verifying the validity of the DCVV code.

In a particular implementation, the IC card is a bank card and the authentication server is an access control server, and wherein, if the security code is determined as being of the DCVV type, the access control server performs the following steps:

verifying, on the basis of the transaction data, whether 3DS authentication of the bank card can be performed; and if so, performing authentication of said bank card using the 3DS protocol.

In a particular implementation, the IC card is a bank card and the authentication server is a 3DS directory server, and wherein, if the security code is determined as being of the DCVV type, the 3DS directory server performs the following steps:

verifying, on the basis of the transaction data, whether 3DS authentication of the bank card can be performed; and if so, transmitting the transaction data to an access control server in order to cause said bank card to be authenticated using the 3DS protocol.

In a particular implementation, the authentication server configures itself to detect that no 3DS authentication is to be performed if a security code included in the transaction data is of the DCVV type, only if a parameter in a predefined state is received from the access server together with the transaction data.

The invention also provides a control method performed by an access server for giving access to a service, the method comprising:

receiving transaction data associated with an IC card during a transaction with the access server;

transmitting transaction data to an authentication server in order to request authentication of the transaction using the 3DS protocol; and determining, from an authentication message received from the server, that no authentication using the 3DS protocol is to be performed if the IC card is of the DCVV type.

In a particular embodiment, the access server determines that the authentication has been performed successfully on receiving, from the control server, a positive verification message concerning verification of a DCVV security code included in the transaction data.

In a particular embodiment, the access server sends a parameter together with the transaction data to the authentication server, said parameter being in a predefined state in order to indicate that no 3DS authentication is to be performed if the security code included in the transaction data is of the DCVV type.

In a particular embodiment, the various steps of the authentication method performed by the authentication server as defined above are determined by computer program instructions.

Likewise, in a particular embodiment, the various steps of the control method performed by the access server as defined above are determined by computer program instructions.

Consequently, the invention also provides a computer program on a data medium (or recording medium), the program being suitable for being executed in a server, or more generally in a computer, the program including instructions adapted to perform steps of at least one of the methods as defined above.

The invention also provides a computer-readable data medium (or recording medium) including instructions of a computer program as mentioned above.

It should be observed that the programs mentioned in the present disclosure may use any programming language, and be in the form of source code, object code, or code intermediate between source code and object code, such as in a partially compiled form, or in any other desirable form.

Furthermore, the above-mentioned data media may be any entity or device capable of storing the program. For example, the medium may comprise storage means such as a read only memory (ROM), e.g. a compact disk (CD) ROM, or a microelectronic circuit ROM, or indeed magnetic recording means, e.g. a floppy disk or a hard disk.

Furthermore, the data media may correspond to a transmissible medium such as an electrical or optical signal suitable for being conveyed via an electrical or optical cable, by radio, or by other means. The program of the invention may in particular be downloaded from an Internet type network.

Alternatively, the data media may correspond to an integrated circuit in which the program is incorporated, the circuit being adapted to execute or to be used in the execution of the method in question.

BRIEF DESCRIPTION OF THE DRAWINGS

Other characteristics and advantages of the present invention appear from the following description made with reference to the accompanying drawings, which show embodiments having no limiting character. In the figures.

DETAILED DESCRIPTION OF EMBODIMENTS

As mentioned above, the present invention relates to authentication mechanisms, and relates more particularly to authentication using a security code of an IC card.

In order to secure remote transactions, one solution consists in using bank cards that are suitable for generating a dynamic security card known as a dynamic card verification value (DCVV) that changes during the lifetime of the card, and for displaying it on a screen of the card. The computer processor system of the transaction financial service is suitable for verifying the validity of the dynamic security code, e.g. as a function of a time parameter, in order to validate or not validate the transaction. The use of such a dynamic security code serves to ensure that the user genuinely has the bank card in question to hand at the time of the transaction. If the dynamic security code is stolen, it is of limited use insofar as the validity of the code is only temporary.

In the present disclosure, the term DCVV integrated circuit (IC) card (or DCVV card) is used to designate an IC card suitable for generating dynamic card verification values (DCVVs). DCVVs are known to the person skilled in the art and are therefore not described in greater detail in the present disclosure.

The invention proposes improving existing authentication mechanisms by inhibiting the 3DS authentication protocol when it is possible to authenticate a current transaction from a DCVV, under circumstances in which a DCVV can be generated by the user's IC card.

It should be observed that the concept of a "transaction" should be understood broadly herein and, by way of example, in the banking field, it covers any type of financial transaction, e.g. such as a payment transaction, a transfer transaction, or indeed consulting a bank account.

In various embodiments, the invention deploys an authentication server suitable for receiving, from a server giving access to a service, an authentication request including transaction data associated with an IC card; for determining whether a security code included in the transaction data is of the DCVV type; and if so, for detecting that no 3DS authentication is to be performed in order to authenticate said card and for co-operating with a verification server in order to verify the validity of the DCVV.

In a particular embodiment, the invention also provides an access server suitable for receiving transaction data associated with an IC card during a transaction with the access server; for transmitting the transaction data to an authentication server for requesting authentication of the transaction using the 3DS protocol; and, on the basis of a message received from the authentication server, for determining that no 3DS protocol authentication is to be performed if the IC card is of the DCVV type. By way of example, the access server may determine that the transaction data is authentic on the basis of a message received from the authentication server and indicating that the DCVV included in the transaction data has been successfully verified.

Other aspects and advantages of the present invention appear from embodiments described below with reference to the above-mentioned drawings.

Unless mentioned to the contrary, elements that are common or analogous to more than one of the figures are given the same reference signs and present characteristics that are identical or analogous, such that those common elements are generally not described again for reasons of simplicity.

Figure 1A:
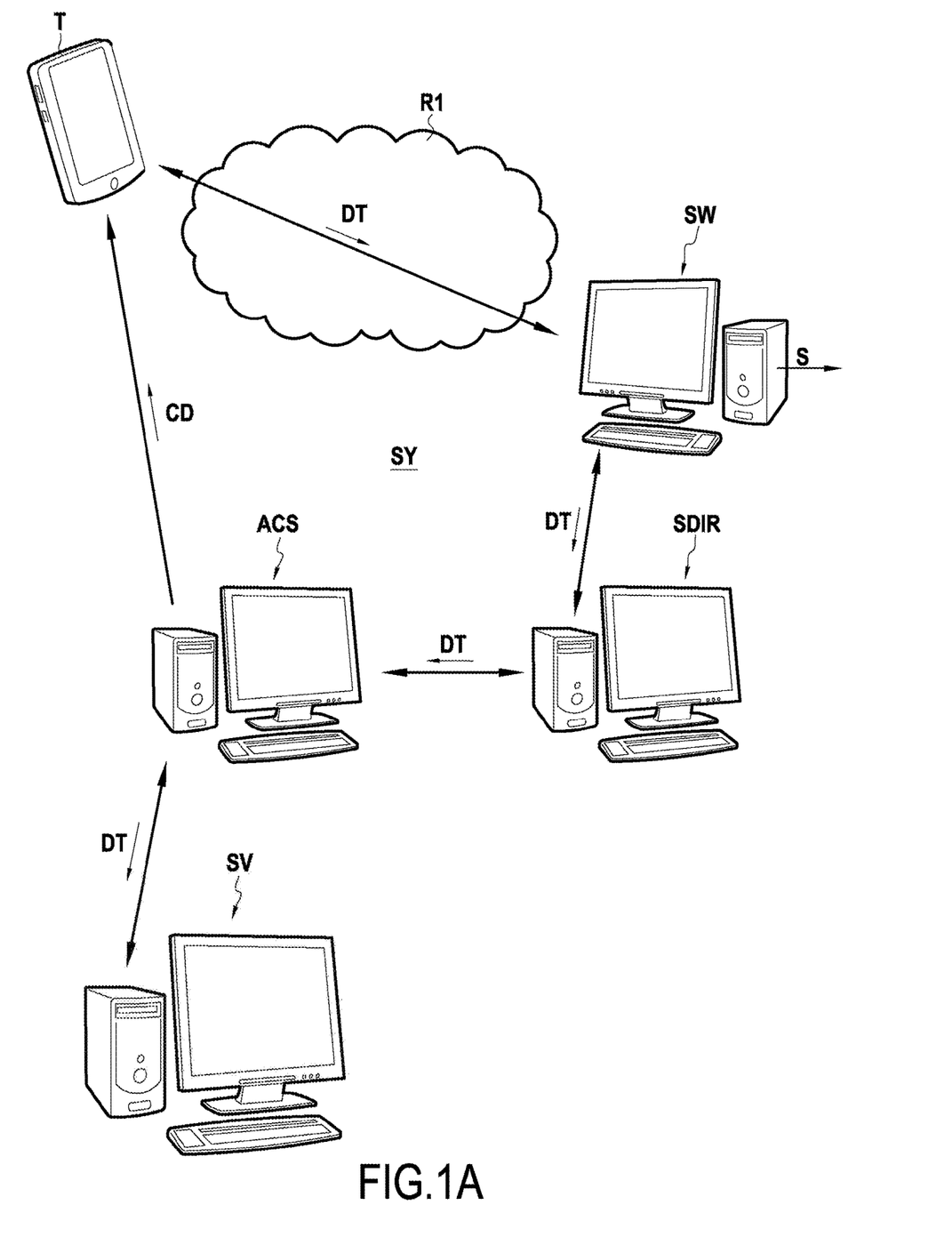
FIG. 1A is a diagram of a system comprising a terminal, a server giving access to a service, a 3DS directory server, an access control server (ACS), and a DCVV verification server, in a particular embodiment of the invention.

FIG. 1A is a diagram showing a system SY in a particular embodiment of the invention. The system SY in this example comprises a terminal T, an access server SW, a 3DS directory server, written SDIR, an access control server ACS, and a verification server SV, in a particular embodiment of the invention.

In this example, the system SY serves to control a user's access to a service S. In the presently-envisaged example, a user attempts to use the service S by means of an IC card C shown in FIG. 1B.

Figure 1B:
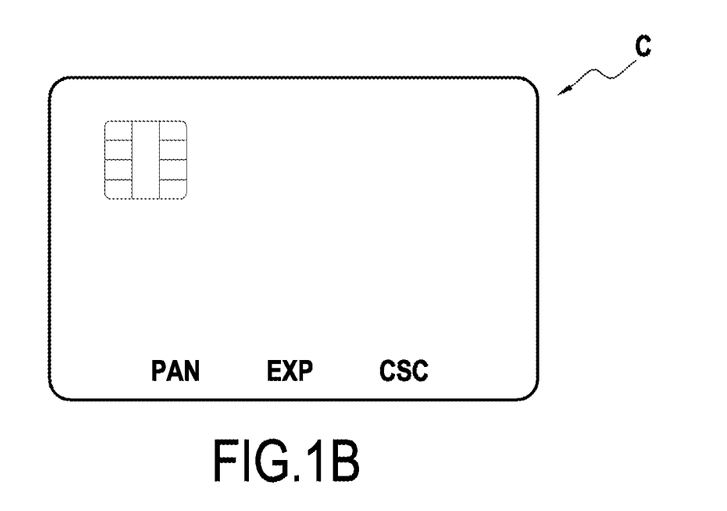
FIG. 1B is a diagram showing an IC card in a particular embodiment of the invention.

In the embodiment shown in FIG. 1B, and as set out in the embodiments that follow, the IC card C in this example is a bank card including bank card data, namely a primary account number (PAN), an expiry date (EXP), and a card security code (CSC). It can be understood that the security code CSC may be a card verification value (CVV) that appears on the card or a dynamic card verification value (DCVV) that can be generated by the card.

By way of example, the bank card C complies with the Europay Mastercard Visa (EMV) protocol. Other types of IC card may be envisaged in the context of the invention.

The user of the terminal T shown in FIG. 1A is capable, in this example, of communicating via a communications network R1, e.g. such as the Internet, with an access server SW controlling access to the service S. During a transaction, the terminal T is suitable for sending to the access server SW transaction data DT that is associated with the IC card C, e.g. in order to perform a financial transaction (purchase, . . . ) with the service S. By way of example, the transaction data DT may comprise the primary account number PAN, the expiry date EXP, and the security code CSC.

By way of example, the server SW is a web server, of commercial or other type, suitable for managing user access to the web server S in question. It can be understood that the service S may be any service. In a particular example, the service S is a commercial service.

The access server SW is suitable for co-operating with a 3DS directory server SDIR in order, where possible, to trigger authentication of the user using the 3DS protocol during a transaction. For this purpose, the access server SW is suitable for transmitting the transaction data DT to the 3DS directory server SDIR in order to request authentication of the current transaction.

On the basis of the transaction data DT received, the access control server ACS is suitable for determining whether a 3DS authentication of the transaction is to be performed. The access control server ACS determines whether or not 3DS authentication is to be performed on the basis of the transaction data DT transmitted by the 3DS directory server SDIR. In a particular embodiment, the server ACS is configured to detect that no 3DS authentication is to be performed if the security code CSC included in the transaction data DT is of the DCVV type.

In the presently-envisaged example, if no 3DS authentication is to be performed, the server ACS is also configured to co-operate with the verification server SV in order to verify the validity of the DCVV type security code CSC. If authentication of the security code CSC is positive, then the server ACS sends a message indicating positive authentication of the transaction data DT to the access server SW via the 3DS directory server SDIR. In a particular example, the positive authentication message also informs the access server SW that no 3DS authentication has been performed, e.g. by means of a parameter provided for this purpose, in said message.

In a particular embodiment, if the security code CSC is a static code of CVV type, then the server ACS is configured to detect that 3DS authentication is to be performed in association with the received transaction data DT. The access control server ACS then performs the 3DS authentication using the 3DS protocol as is well known to the person skilled in the art.

Figure 2:
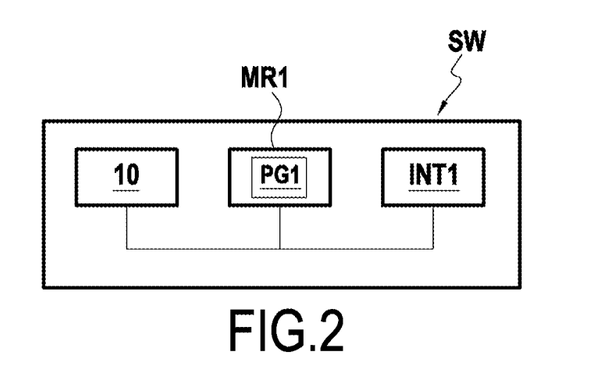
FIG. 2 is a diagram showing the structure of an access server in a particular embodiment of the invention.

FIG. 2 is a diagram showing the structure of the access server S in a particular embodiment of the invention. In this example, the access server SW has a processor 10, a non-volatile memory MR1, and a communications interface INT1.

In the presently-envisaged example, the memory MR1 is a rewritable non-volatile memory or a ROM, this memory constituting a particular embodiment of a data medium (or recording medium) that is readable by the access server SW and that stores a particular embodiment of a computer program PG1. The computer program PG1 includes instructions for executing steps of particular implementation of a control method.

Figure 3:
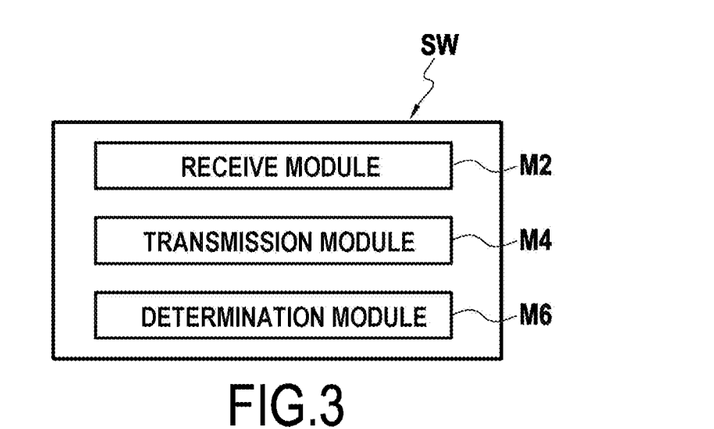
FIG. 3 is a diagram showing modules deployed in the access server shown in FIGS. 1A and 2, in accordance with a particular embodiment of the invention.

The processor 10 controlled by the computer program PG1 in this example deploys a certain number of modules as shown in FIG. 3, namely: a receive module M2, a transmission module M4, and a determination module M6.

In a particular embodiment, the receive module M2 is suitable for receiving the transaction data DT associated with the IC card C during a transaction with the access server SW. The transmission module M4 is suitable for transmitting the transaction data DT to the 3DS directory server SDIR in order to request authentication of the transaction using the 3DS protocol. The determination module M6 is suitable for responding to a message received from the authentication server in order to determine that no 3DS protocol authentication is to be performed, if the IC card is of the DCVV type.

Figure 4:
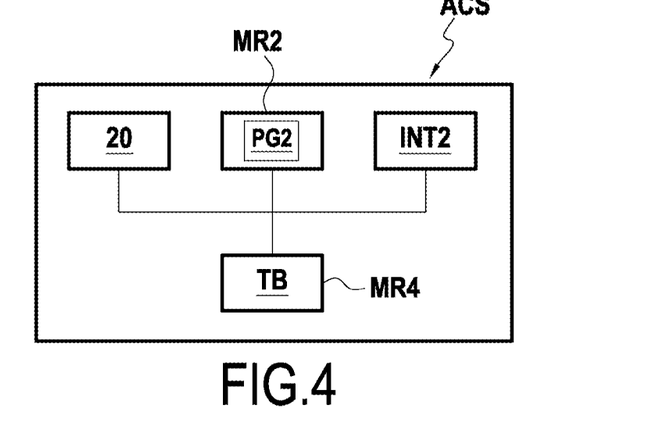
FIG. 4 is a diagram of the structure of an ACS server in a particular embodiment of the invention.

FIG. 4 is a diagram showing the structure of the access control server ACS in a particular embodiment of the invention. In this example, the server ACS comprises a processor 20, a non-volatile memory MR2, a communications interface INT2, and a non-volatile memory MR4 including a table TB.

In the presently-envisaged example, the memory MR2 is a rewritable non-volatile memory or a ROM, this memory constituting a particular embodiment of a data medium (or recording medium) that is readable by the server ACS and that stores a particular embodiment of a computer program PG2. The computer program PG2 includes instructions for executing steps of a particular implementation of an authentication method.

Figure 6:
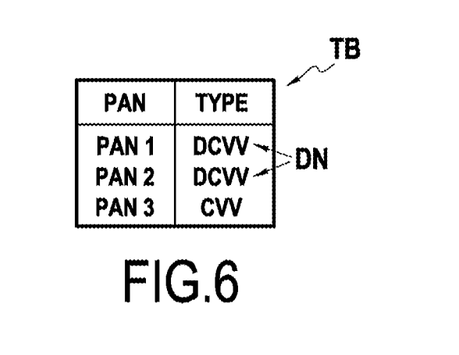
FIG. 6 shows an example of a table stored in a memory of the ACS server shown in FIGS. 1A and 4, in accordance with a particular embodiment of the invention.

In a particular example, the table TB includes at least one correspondence between an identifier PAN and a data value DN, said data value DN indicating whether the bank card C associated with said PAN is of the DCVV type. On the basis of said data value DN, the server ACS is suitable for determining whether the bank card C is of the DCVV type. Using the table TB, the server ACS can thus determine whether the security code CSC included in the transaction data DT is of DCVV type. It is assumed herein, by way of example, that the table TB identifies data values DN in association with three identifiers PAN1, PAN2, and PAN3.

In a particular example, each data value DN may have two distinct states indicating that the corresponding identifier PAN is associated with a bank card either of DCVV type or else of CVV type.

Figure 5:
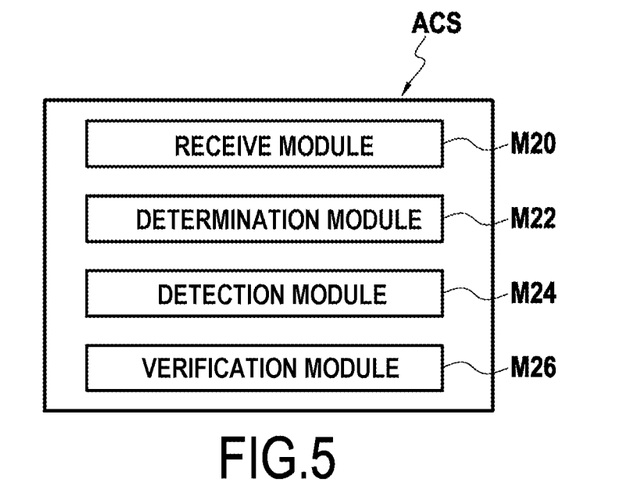
FIG. 5 is a diagram of modules deployed in the ACS server shown in FIGS. 1A and 4, in accordance with a particular embodiment of the invention.

In this example, the processor 20 controlled by the program PG2 deploys a certain number of modules, as shown in FIG. 5, namely: a receive module M20, a determination module M22, a detection module M24, and a verification module M26.

In a particular embodiment, the receive module M20 is suitable for receiving an authentication request from the access server SW, which request includes the transaction data DT associated with the IC card C. The determination module M22 is configured to determine whether the security code CSC included in the transaction data DT is of the DCVV type. If the security code CSC is determined as being of the DCVV type:

the detection module M24 is configured to detect that no 3DS authentication is to be performed; and the verification module M26 is configured to co-operate with the verification server SV in order to verify the validity of the DCVV security code.

It can be understood that the definition of the modules M2 to M6 shown in FIG. 3 and of the modules M20 to M26 shown in FIG. 5 constitutes merely a non-limiting embodiment of the invention, and other embodiments can be envisaged in the context of the invention.

Figure 7:
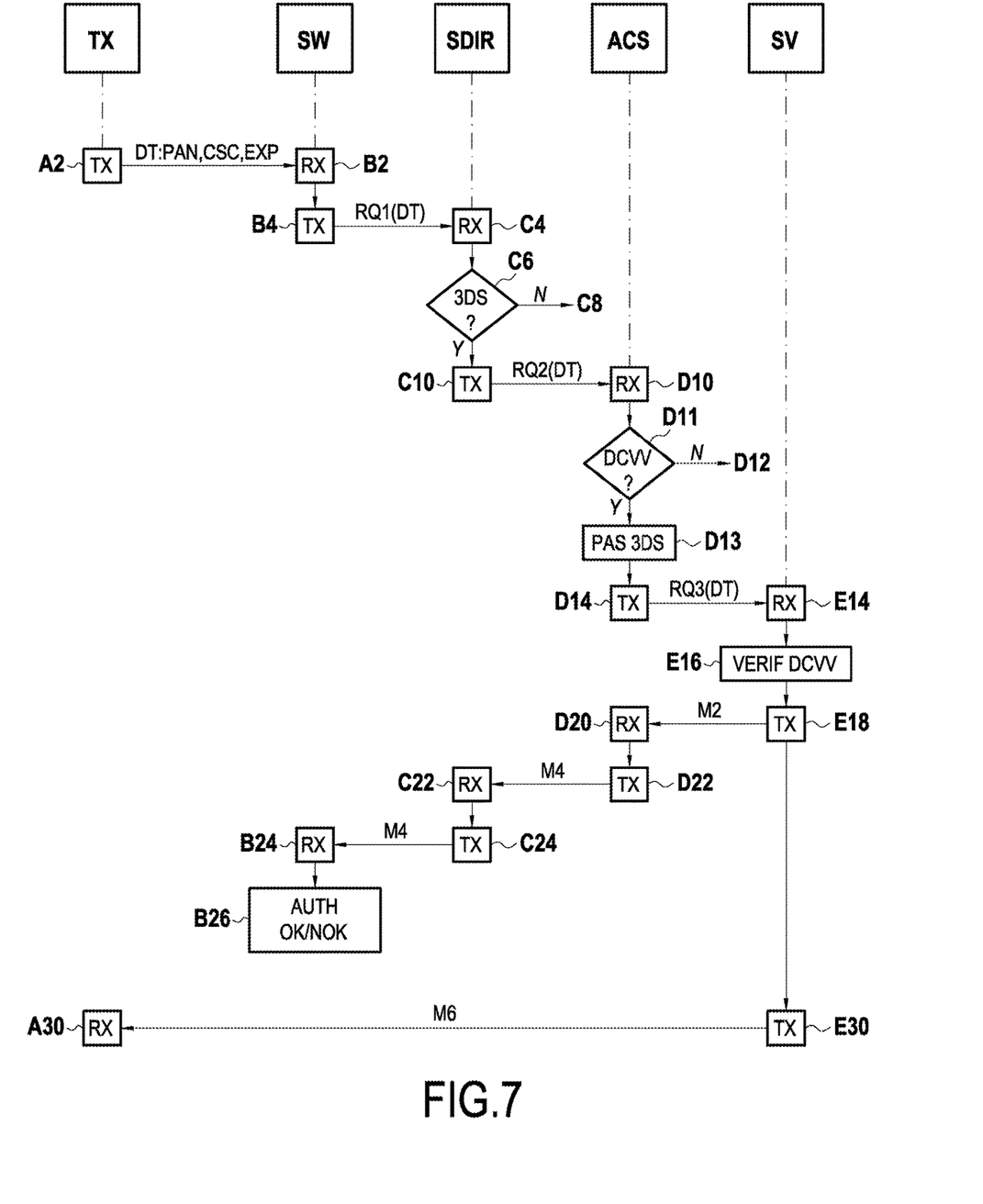
FIG. 7 is a flow chart showing the steps performed in particular by the access server, the 3DS directory server, and the ACS server in accordance with a particular implementation of the invention.

A particular implementation of the invention is described below with reference to FIG. 7. More precisely, in this example, the access server SW performs a control method by executing the computer program PG1, and the server ACS performs an authentication method by executing the computer program PG2.

It is assumed at this point that a user is attempting to carry out a transaction with the access server SW (or more precisely with the service S) by using the bank card C. In a particular example, the transaction is a financial transaction, e.g. corresponding to a payment. It should be understood that other implementations can be envisaged in the ambit of the invention.

During a sending step A2, the user's terminal T sends transaction data DT associated with the bank card C to the access server SW. In this example, the transaction data DT comprises the identifier PAN, the access code CSC, and the expiry date EXP of the card C. For this purpose, and by way of example, the user inputs beforehand some or all of the transaction data DT into the terminal T in response to an invitation from the service S.

The access server SW receives the transaction data DT during a receive step B2. The access server SW then sends (B4) the transaction data DT to the 3DS directory server SDIR in an authentication request RQ1. In a particular example, the authentication request RQ1 requests authentication using the 3DS protocol.

After receiving (C4) the transaction data DT, the 3DS directory server SDIR determines (C6) on the basis of some or all of the transaction data DT (e.g. on the basis of the identifier PAN), whether it is authorized to proceed with a 3DS authentication for the current transaction. In a particular example, the server SDIR performs the determination (C6) on the basis of a list of identifiers PAN that are excluded from the 3DS mechanism or from a list of identifiers PAN that are authorized to use the 3DS mechanism.

If, in C6, it is determined that 3DS authentication is not authorized, then the method ends (C8). The server SDIR may optionally send a message to the access server SW indicating refusal to perform 3DS authentication.

In contrast, if the 3DS directory server SDIR determines (C10) that it is authorized to perform 3DS authentication in association with the received transaction data DT, said server SDIR sends (C10) to the server ACS an authentication request RQ2 including the transaction data DT.

The access control server ACS receives the transaction data DT included in the authentication request RQ2 during a receive step D10.

Thereafter, on the basis of the transaction data DT, the server ACS determines (D11) whether the security code CSC is of the DCVV type. In a particular example, the server ACS determines (D11) whether the security code CSC is a DCVV code on the basis of the identifier PAN included in the transaction data DT. In a particular example, the server ACS uses the table TB to determine whether the security code is of the DCVV type, on the basis of the identifier PAN.

If, in D11, it is determined that the code CSC of the card C is not a DCVV dynamic code, then the authentication method of the invention ends (D12). During the step D12, the server ACS may perform 3DS authentication of the transaction (if that is possible), or it may send a message refusing a 3DS transaction (if authentication using the 3DS protocol is not possible).

In a particular implementation, if the security code CSC is a CVV type static code and if, on the basis of the transaction data, the server AC determines that it is authorized to proceed with 3DS authentication, the server ACS authorizes (D12) the performance of 3DS authentication of said bank card. During such 3DS authentication, the user may receive a secret code by SMS or email on a terminal (T or some other terminal), and be invited by the terminal T to input the secret code in order to be authenticated by the ACS server. Since the 3DS protocol is well known to the person skilled in the art, it is not described in greater detail in the present disclosure for reasons of simplicity.

In contrast, if, in D11, it is determined that the security code CSC is of the DCVV type, then the server ACS:

detects (D13) that no 3DS authentication is to be performed; and co-operates (D14-D20) with the verification server SV to verify the validity of the security code CSC.

In a particular implementation, if the security code is of the DCVV type (D11), the ACS server prevents performance of 3DS authentication of the bank card C. In other words, when the bank card C is of DCVV type, the server ACS is configured to block the performance of 3DS authentication for the transaction that is being authenticated.

In a particular example, during said co-operation D14-D20, the server ACS sends (D14) to the verification server SV the transaction data DT including the security code CSC of DCVV type, the bank identifier PAN, and the expiry date EXP. Once this data has been received (E14), the verification server verifies (E16) the validity of the dynamic security code CSC. By way of example, the verification server verifies the validity of the dynamic security code CSC by generating a second DCVV code and by comparing it with the dynamic security code CSC received in E14. In a particular example, the verification server SV obtains this second DCVV code by applying a cryptographic function to the identifier PAN, to the expiry date EXP, and time data. Other examples of verifying a dynamic security code of DCVV type can be envisaged. Since calculating and verifying the validity of a DCVV security code are themselves known, they are not described in greater detail in the present disclosure.

The verification server SV then sends (E18) the result of the verification E16 (in this example in a message M2) to the server ACS.

The server ACS receives the result M2 of verifying the validity of the security code CSC during a receive step D20. Thereafter, the server ACS sends (D22), to the 3DS directory server SDIR, a positive authentication message M4 concerning the transaction data DT, providing verification E16 of the validity of the security code CSC took place successfully. Otherwise, the server ACS sends (D22) a negative authentication message M4 to the 3DS directory server SDIR. In a particular example, the message M4 specifies whether the security code DCVV present in the transaction data DT was or was not successfully verified.

Once received (C22), the 3DS directory server SDIR transfers (C24) to the access server SW the message M4 indicating whether authentication on the basis of the dynamic security code CSC took place successfully.

The access server SW determines (B26) whether authentication of the transaction has taken place successfully on the basis of the message M4 received prior to the receive step B24. It can be understood that the access server SW may be configured to perform any appropriate processing as a function of the result of the authentication.

In a particular implementation, if it is determined (B26) that the authentication took place successfully, then the access server SW authorizes (B26) the current transaction with the user. Otherwise, the access server SW refuses (B26) the transaction.

The present invention is advantageous in that it makes it possible to avoid the mechanism of authentication by means of the 3DS protocol when it is possible to authenticate the user of the transaction by verifying a DCVV dynamic security code generated by the user's IC card (when said card is of the DCVV type). As set out above, authentication using the 3DS protocol presents certain drawbacks, in particular in that it can be found troublesome by certain users, sometimes leading to the current transaction being abandoned. The invention makes it possible to inhibit the 3DS mechanism while maintaining a high level of security by verifying, whenever possible, a DCVV code. By means of the invention, it is possible to facilitate authentication of a user, and thus to facilitate access to a service.

It can be understood that the implementation described above with reference to FIG. 7 merely constitutes a non-limiting implementation of the invention, and a variety of implementations can be envisaged in the ambit of the invention.

In a particular implementation, once the verification step E16 has been performed, the verification server SV (or one of the servers from among the server ACS, the 3DS directory server SDIR, and the access server SW) also sends (E18) a message M6 to the user's terminal T (or to some other terminal). On the basis of the message M6 as received (A30), the user can then determine the result of the security code CSC (of DCVV type) being authenticated by the verification server SV.

In a particular implementation, the server ACS includes in its positive authentication message M4 a parameter informing the access server SW that no authentication by the 3DS protocol has been performed. On the basis of this parameter, the access server SW can thus deduce that the 3DS authentication mechanism was blocked but that authentication was nevertheless performed successfully by verifying a DCVV security code.

Another implementation is described below with reference to FIG. 8. In this implementation, steps A2, B2, B4, and C4 are performed as described above with reference to the implementation shown in FIG. 7. The implementation shown in FIG. 8 differs from the above implementation in that this time it is the 3DS directory server SDIR that uses the transaction data DT to determine (C50) whether the bank card C is of the DCVV type, and, if so, that detects (C51) that no 3DS protocol authentication is to be performed, and that then co-operates (C52) with the server ACS, or directly with the verification server SV, to verify the validity of the dynamic security code CSC. The determination step C50 and the detection step C51 are performed analogously to steps D11 and D13 respectively as described above with reference to FIG. 7.

Figure 8:
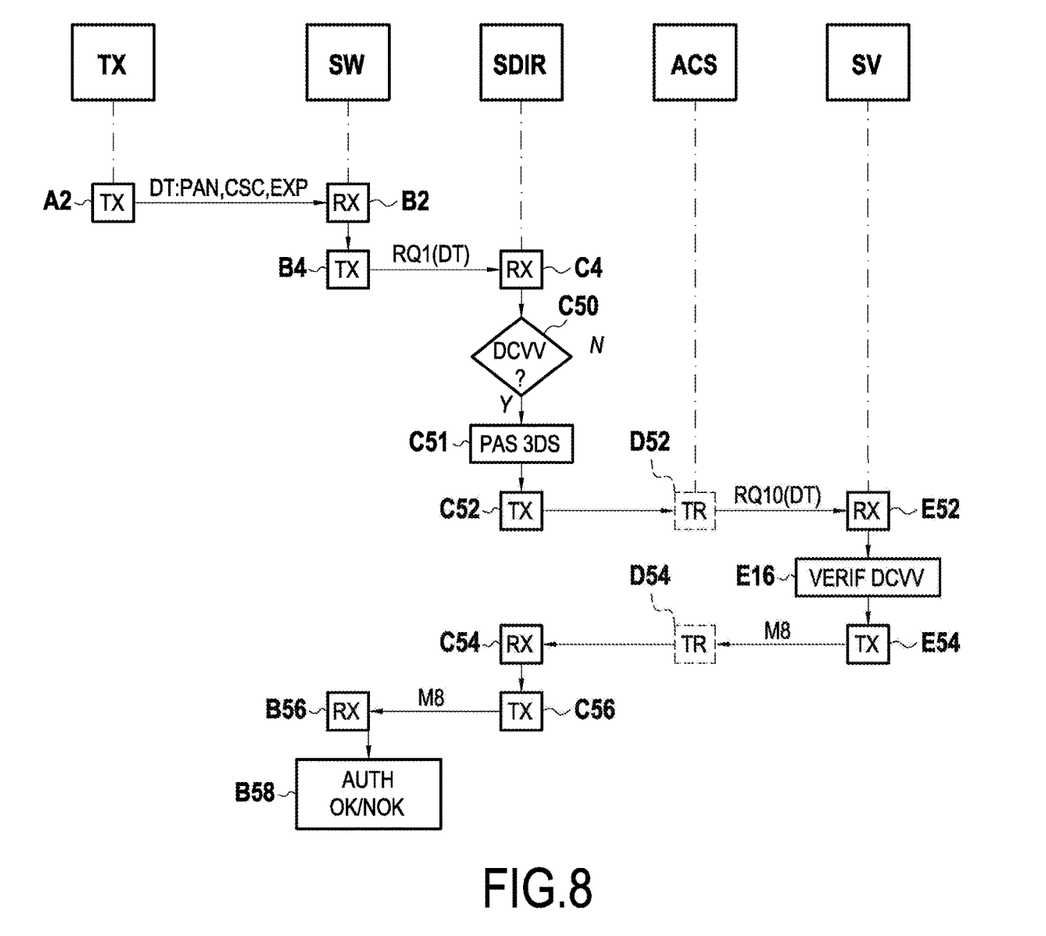
FIG. 8 is a flow chart showing steps performed in particular by the access server, the 3DS directory server, and the ACS server, in accordance with a variant of the implementation shown in FIG. 7.

As shown in FIG. 8, after the detection step C51, the 3DS directory server SDIR sends (C52) to the verification server SV a verification request RQ10 including the transaction data DT. Alternatively, the 3DS directory server SDIR sends (C52) the verification request RQ10 to the server ACS, which transmits (D52) it to the verification server SV.

The verification server SV verifies (E16) the validity of the dynamic security code CSC, as described above with reference to FIG. 7.

During the sending step E54, the verification server SV then sends a positive or negative authentication message M8 (depending on the result of E16) concerning the transaction data DT to the 3DS directory server SDIR, possibly via the server ACS, which then transfers (D54) said message.

From the above, it can be seen that, depending on the implementation of the invention, it is the 3DS directory server SDIR or the server ACS that uses the transaction data DT to determine whether the bank card C is of the DCVV type, and if so, to detect that no 3DS protocol authentication is to be performed, and that causes the validity of the dynamic security code CSC of the card C to be verified. Thus, the 3DS directory server SDIR and the ACS server are each capable of constituting an authentication server in the meaning of the invention.

In a variant of the above implementations, the authentication server of the invention configures itself to detect that no 3DS authentication is to be performed when a security code included in the transaction data is of the DCVV type only if a parameter in a predefined state is received from the access server SW together with the transaction data DT. In other words, on the basis of a parameter sent by the access server SW, the authentication server of the invention (i.e. the 3DS directory server SDIR or the server ACS, as the case may be), is suitable for determining whether it is to perform the mechanism of the invention for inhibiting the 3DS authentication mechanism. In a particular example, if this parameter is in a first predetermined state, then the authentication server always attempts to trigger 3DS authentication, and if said parameter is in a second predetermined state, then the authentication server inhibits the 3DS mechanism if authentication on the basis of a DCVV security code is possible.

In a particular implementation, the authentication server of the invention (i.e. the 3DS directory SDIR or the server ACS, as the case may be) uses history data (e.g. bank data) stored in association with the identifier PAN to determine whether it is to perform the 3DS authentication inhibition mechanism in accordance with the invention. The authentication server can thus act, for the current transaction, to assess a level of risk and to deduce therefrom whether it is necessary to perform 3DS authentication (e.g. in addition to verifying a DCVV security code, depending on the selected configuration).

A person skilled in the art understands that the above-described implementations and variants merely constitute non-limiting examples of how the invention can be performed. In particular, the person skilled in the art can envisage any adaptation or combination of the above-described implementations and variants in order to satisfy any particular need.

The invention claimed is:

1. An authentication method performed by an authentication server, the method comprising:
   receiving, from an access server giving access to a service, an authentication request including transaction data associated with an integrated circuit (IC) card for requesting a 3Domain Secure (3DS) authentication according to a 3DS protocol;
   determining whether a security code included in the transaction data is a dynamic card verification value (DCVV) security code;
   if so, blocking performance of the 3DS authentication requested by the access server on the IC card and co-operating with a verification server to verify validity of the DCVV security code; and
   if not, authorizing performance of the 3DS authentication on the IC card.

2. The method according to claim 1, further comprising:
   sending, to the access server, a positive authentication message concerning the transaction data if the validity of the DCVV security code is verified successfully during said co-operating with the verification server.

3. The method according to claim 1, wherein determining whether the security code included in the transaction data is a DCVV security code comprises:
   determining, by the authentication server, whether the IC card is of a DCVV type based on a PAN identifier included in the received transaction data; and
   only if so, determining that the security code is a DCVV security code.

4. The method according to claim 1, wherein, if the security code is a DCVV security code and if the authentication server determines based on the transaction data that the authentication server is authorized to proceed with 3DS authentication, the authentication server authorizes performance of the 3DS authentication of said IC card.

5. The method according to claim 1, wherein the IC card is a bank card and the transaction data includes a PAN identifier and an expiry date of said bank card.

6. The method according to claim 5, wherein co-operating with the verification server comprises:
   sending, to the verification server, the transaction data including the DCVV security code, the PAN bank identifier, and the expiry date; and
   in response, receiving the results of verifying the validity of the DCVV security code.

7. The method according to claim 1, wherein the IC card is a bank card and the authentication server is an access control server, and wherein, if the security code is determined as being a DCVV security code, the access control server performs the following steps:
   verifying, based on the transaction data, whether 3DS authentication of the bank card can be performed; and
   if 3DS authentication of the bank card can be performed, performing authentication of said bank card using the 3DS protocol.

8. The method according to claim 1, wherein the IC card is a bank card and the authentication server is a 3DS directory server, and wherein, if the security code is determined to be a DCVV security code, the 3DS directory server performs the following steps:
   verifying, based on the transaction data, whether 3DS authentication of the bank card can be performed; and
   if 3DS authentication of the bank card can be performed, transmitting the transaction data to an access control server to cause said bank card to be authenticated using the 3DS protocol.

9. The method according to claim 1, wherein the authentication server configures itself to detect that no 3DS authentication is to be performed if the security code included in the transaction data is a DCVV security code, only if a parameter in a predefined state is received from the access server together with the transaction data.

10. A control method performed by an access server for giving access to a service, the method comprising:
    receiving transaction data associated with an integrated circuit (IC) card during a transaction with the access server;
    transmitting the transaction data to an authentication server in order to request authentication of the transaction using a 3 Domain Secure (3DS) protocol; and
    determining, from an authentication message received by the access server, that no authentication using the 3DS protocol is to be performed if the IC card is of a dynamic card verification value (DCVV) type.

11. The method according to claim 10, wherein further comprising:
    determining that the authentication has been performed successfully on receiving, from a control server, a positive verification message concerning verification of a DCVV security code included in the transaction data.

12. The method according to claim 10, wherein the access server sends a parameter together with the transaction data to the authentication server, said parameter being in a predefined state in order to indicate that no 3DS authentication is to be performed if the security code included in the transaction data is of a DCVV security code.

13. A non-transitory computer-readable data medium storing a computer program including instructions that, when executed by a processor, cause the processor to perform operations comprising:
receiving, from an access server giving access to a service, an authentication request including transaction data associated with an integrated circuit (IC) card, wherein the transaction data is used for requesting a 3Domain Secure (3DS) authentication according to a 3DS protocol;
determining whether a security code included in the transaction data is a dynamic card verification value (DCVV) security code;
if so, blocking performance of the 3DS authentication on the IC card per the received authentication request and co-operating with a verification server to verify validity of the DCVV security code; and
if not, authorizing performance of the 3DS authentication on the IC card.

14. An authentication server comprising:
a receive module suitable for receiving from an access server giving access to a service, via a 3Domain Secure (3DS) directory server, transaction data associated with an integrated circuit (IC) card for requesting a 3DS authentication according to a 3DS protocol;
a determination module for determining whether a security code included in the transaction data is a dynamic card verification value (DCVV) security code; and
a detection module and a verification module, in which, if the security code is determined as being a DVCC security code:
the detection module is configured to block performance of the 3DS authentication of the IC card requested by the access server; and
the verification module is configured to co-operate with a verification server to verify validity of the DCVV security code; and
if the security code is not a DCVV security code, the detection module is configured to authorize performance of 3DS authentication on the IC card.

15. An access server giving access to a service, the server comprising:
a receive module for receiving transaction data associated with an integrated circuit (IC) card during a transaction with the access server;
a transmission module for transmitting the transaction data to an authentication server to request authentication of the transaction using a 3 Domain Secure (3DS) protocol; and
a determination module for determining, from a message received from the authentication server, that no authentication using the 3DS protocol is to be performed if the IC card is of a dynamic card verification value (DCVV) type.

* * * * *

UNITED STATES PATENT AND TRADEMARK OFFICE
CERTIFICATE OF CORRECTION

PATENT NO. : 10,909,530 B2
APPLICATION NO. : 16/064940
DATED : February 2, 2021
INVENTOR(S) : Stéphane Girodon Page 1 of 1

It is certified that error appears in the above-identified patent and that said Letters Patent is hereby corrected as shown below:

In the Claims

In Claim 7, Column 12, Line 17, "DCVV" should read -- CVV --; and

In Claim 8, Column 12, Line 27, "DCVV" should read -- CVV --.

Signed and Sealed this
Fifth Day of October, 2021

Drew Hirshfeld
*Performing the Functions and Duties of the*
*Under Secretary of Commerce for Intellectual Property and*
*Director of the United States Patent and Trademark Office*